A. Anderson,
Governor.

Nº 21,056.

Patented Aug. 3, 1858.

UNITED STATES PATENT OFFICE.

A. ANDERSON, OF LANCASTER, OHIO.

GOVERNOR FOR STEAM-ENGINES.

Specification of Letters Patent No. 21,056, dated August 3, 1858.

*To all whom it may concern:*

Be it known that I, ALBAN ANDERSON, of Lancaster, in the county of Fairfield and State of Ohio, have invented a new and useful Improvement in Governors for Steam and other Engines; and I do hereby declare that the following is a full, clear, and exact description of the construction and operation of the same, reference being had to the annexed drawing, forming part of this specification, in which—

Figure 1:
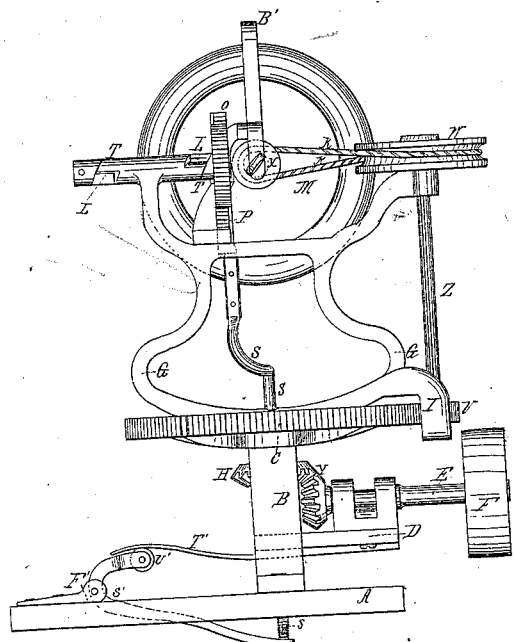
Figure 3:
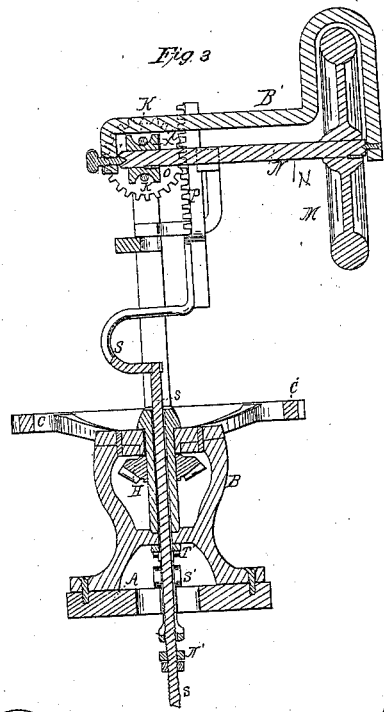
Figure 2:
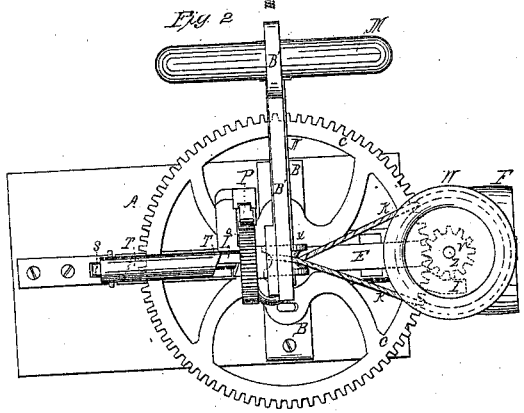
Figure 4:
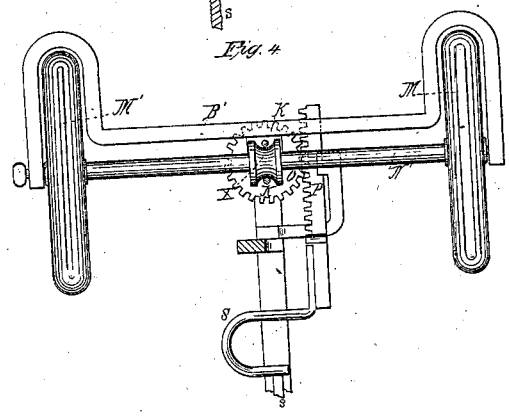

Figure 1 is a side elevation of the machine. Fig. 2 is a top view of the same. Fig. 3 is a vertical section through axes of hollow shaft and shaft N. Fig. 4 is a view showing attachment of double wheel shaft.

Similar characters of reference in the several figures denote the same part.

My invention consists in a machine which sets in regulated and adjusted motion, a disk and the frame which supports it, and obtaining therefrom a resultant force which is of considerable power, and is very sensitive to an increase or diminution of velocity; and in adjusting and regulating the force or power so obtained, so that it may be applied as a governor to steam or other engines, or machinery, and to control and regulate valves for cutting off steam where steam is used expansively, and to other like objects and purposes.

To enable others skilled in the art to make and use my invention I will proveed to describe its construction and operation.

The machine moves upon a base, which may be formed to suit the situation in which it is to be placed, but may be conveniently composed of A—a base board, or plinth. B—die secured to the plinth. C—a spur wheel supported by four arms issuing from the top of the die. This wheel though stationary is one of the elements which give its rotary motion to the disk. D—an arm of die, supporting the journals of the shaft E. The part of machine which moves and by its compound motion generates the resulting force or power, the generation and application of which is the subject of this invention, is composed of F—belt pulley. E—shaft. Y—bevel wheel. H—bevel wheel working in Y, firmly attached to the frame G G by a short shaft. G G—revolving frame work which supports the disk, and the machinery above the spur wheel which gives the disk its rotary motion. I— arm of the upper frame G, supporting the lower end of shaft Z, and containing the step in which the pivot of the shaft revolves. V—pinion wheel on shaft Z, working in spur wheel C. W—sheave attached to shaft Z, and moving with it. M—revolving disk. B'—arm supporting disk. N—shaft passing through center of disk, and revolving with it, supported by pivots on the arm B' (Fig. 3). X—sheave firmly secured to shaft N. K—band communicating motion from sheave W to sheave X; this connection may be made by gear as well as by band. O—pinion wheel firmly attached to arm N; so that the wheel moves with the arm. P—rack working in wheel O, a continuation of which is the rod S S S, passing through die and plinth, so as to move freely. T—compensation screw to take up the slack of band K, when it untwists by the moving of the disk.

Fig. 4 shows two disks on a lengthened shaft N' supported on a double arm or yoke B'. It is moved precisely as the single disk, the sheave X in the center of the shaft, giving motion to the shaft, and with it to the two disks. The double disk doubles the power of the machine.

Where the double disk is used, the following additional machinery must be used also, to counterbalance the power of the wheels, and draw the rod S, when necessary in a direction contrary thereto. T'—spring. U'—friction roller in the end of lever S'. F'—joint or fulcrum to lever S'. S'—lever connected with the rod S S S by a slot, and held in its place by jam nuts N", so that when rod S rises, the lever acts upon the spring T'.

The two disks M M', though they revolve in the same absolute direction, yet in relation to the center around which they are carried by the motion of the frame, their motions are contrary and consequently the tendency of one disk is downward, and the other upward; thus doubling the power. The two disks balance each other, and thus neutralize the action of gravitation, so that the machine is not disturbed in its action by a change of position, as in the careening of a ship or the riding of a wave.

If used as a governor to a steam, or other motive engine, the plinth A may be secured to a plate of convenient height with screws, the rod S S S being passed through the plate and extending below it, and there attached to a lever. The belt pulley F, to be connected by a band with a pulley moved by the main shaft of the steam or other engine. This puts in motion the bevel wheel H, which carries the frame work G G, and the disk which it supports, around with a moderate horizontal motion, and with it the pinion wheel V, which works in the cog wheel C, giving through the shaft Z motion to the large sheave W, which moves the small sheave X, and through it gives a rapid motion to the disk M. One revolution of the frame G, giving about twenty-six of the disk M.

When the machine is at rest, the disk hangs suspended by its shaft and arm, by the side of the frame work G. A segment of it within the curve of the rod S, touching no part of it, and it remains in that position revolving with its own shaft, until the frame G has acquired a motion of about thirty-six revolutions per minute, which gives the disk about nine hundred and thirty-six revolutions, being a motion of about twelve hundred feet per minute on the center of the rim.

The precise velocity at which the disk will just rise to a horizontal position, and raise the rack and rods with their attachments, having been ascertained by experiment, should be its condition when the engine which it is to govern, has its required movement. This being so adjusted, and the machine placed in a perpendicular position, a very slight increase of motion will cause the disk, with its supporting arm to rise, or a slight diminution of motion will suffer them to descend by their own gravity, or by force of the spring T, making the pinion wheel O act upon the rack P and elevate or depress it, together with its attached rod S, S, S. This motion of the disk perpendicular to the compound movement of the disk on its own axis and with the frame as above described is the resultant force referred to in the claim.

The extremity of the rod S may be applied in any convenient manner as a governor to a valve of steam or other engine. In cases where it is more convenient, a rod similar to S, may be produced from the upper extremity of the rack P, and it will have the same power, and may be attached in like manner with the rod S S S, and the machine may be applied in the same manner for adjusting the movement of the valves for cutting off steam in engines where steam is used expansively. It can be made to a certain extent, less or more sensitive, by making the comparative motion of the frame greater or less in proportion to the revolutions of the disk. If the motion of the disk in relation to the motion of the frame be reversed, as by crossing the band K the diminution of the resultant force will be also reversed.

Having described my invention and the operation thereof I disavow all claim to the invention of any single or isolated part of the machinery used in the combination above described, each and all of such parts taken separately being in common use—but What I do claim as new and of my own invention and for which I ask Letters Patent is—

The combination of machinery above described, and the production thereby, or by its equivalent, of the resultant force above defined and the application of such resultant force to the regulation of the movement of machines or engines.

In testimony whereof, I have hereunto signed my name before two subscribing witnesses.

ALBAN ANDERSON.

Witnesses:
 GEO. PATTEN,
 JOHN S. HOLLINGSHEAD.